US009581107B2

(12) United States Patent
Kuroyanagi et al.

(10) Patent No.: US 9,581,107 B2
(45) Date of Patent: Feb. 28, 2017

(54) EXHAUST GAS HEAT EXCHANGING DEVICE

(71) Applicant: DENSO CORPORATION, Kariya, Aichi-pref. (JP)

(72) Inventors: Isao Kuroyanagi, Anjo (JP); Takayuki Hayashi, Nagoya (JP); Takeshi Iguchi, Gifu (JP); Yasutoshi Yamanaka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 330 days.

(21) Appl. No.: 14/366,043

(22) PCT Filed: Dec. 11, 2012

(86) PCT No.: PCT/JP2012/007890

§ 371 (c)(1),
(2) Date: Jun. 17, 2014

(87) PCT Pub. No.: WO2013/094149

PCT Pub. Date: Jun. 27, 2013

(65) Prior Publication Data

US 2015/0267637 A1 Sep. 24, 2015

(30) Foreign Application Priority Data

Dec. 19, 2011 (JP) ................................. 2011-277501
Nov. 30, 2012 (JP) ................................. 2012-262210

(51) Int. Cl.
*B60H 1/00* (2006.01)
*F02G 5/02* (2006.01)
(Continued)

(52) U.S. Cl.
CPC ............... *F02G 5/02* (2013.01); *F02M 26/32* (2016.02); *F28D 7/0083* (2013.01); *F28D 7/106* (2013.01);
(Continued)

(58) Field of Classification Search
CPC ..... F02G 5/02; F28F 9/02; F28F 1/426; F28F 3/042; F28F 9/001; F28F 9/26;
(Continued)

(56) References Cited

U.S. PATENT DOCUMENTS 4,621,677 A * 11/1986 Suzuki ...................... F28F 9/22
165/135
4,958,766 A * 9/1990 Toth .................. B60H 1/00492
237/12.3 B
(Continued)

FOREIGN PATENT DOCUMENTS

EP 2096294 A2 9/2009
JP S37013676 Y 6/1962
(Continued)

OTHER PUBLICATIONS

International Search Report and Written Opinion (in Japanese with English Translation) for PCT/JP2012/007890, mailed Feb. 26, 2013; ISA/JP.
(Continued)

*Primary Examiner* — Ljiljana Ciric
(74) *Attorney, Agent, or Firm* — Harness, Dickey & Pierce, P.L.C.

(57) ABSTRACT

An EGR cooler includes a heat exchanging core which has a plurality of tubes, an upstream-side gas tank portion upstream of the tubes and a downstream-side gas tank portion downstream of the tubes. A water tank portion forms a first water passage around the tubes and forms a second water passage around the upstream-side gas tank portion. A
(Continued)

double pipe portion forms a gas passage which communicates with the upstream-side gas tank portion and forms an annular water passage which communicates with the second water passage. A water inflow pipe is connected to the double pipe portion such that the cooling water flows into the annular water passage, and a water outflow pipe that is connected to the water tank portion such that the cooling water flows out from the first water passage.

9 Claims, 8 Drawing Sheets

(51) Int. Cl.

| | |
|---|---|
| ***F28F 9/02*** | (2006.01) |
| ***F28F 1/42*** | (2006.01) |
| ***F28F 3/04*** | (2006.01) |
| ***F28F 9/00*** | (2006.01) |
| ***F28F 9/26*** | (2006.01) |
| ***F28D 7/00*** | (2006.01) |
| ***F28D 7/10*** | (2006.01) |
| ***F28D 7/16*** | (2006.01) |
| ***F28D 21/00*** | (2006.01) |

(52) U.S. Cl.
CPC ....... *F28D 7/1684* (2013.01); *F28D 21/0003* (2013.01); *F28F 1/426* (2013.01); *F28F 3/042* (2013.01); *F28F 9/001* (2013.01); *F28F 9/02* (2013.01); *F28F 9/26* (2013.01); *F28F 2009/029* (2013.01)

(58) Field of Classification Search
CPC .. F28F 2009/029; F28D 7/0083; F28D 7/106; F28D 7/1684; F28D 21/0003
USPC .................................. 165/41, 51, 52; 60/321
See application file for complete search history.

(56) References Cited

U.S. PATENT DOCUMENTS

| | | | | |
|---|---|---|---|---|
| 5,333,677 | A * | 8/1994 | Molivadas | F03G 6/003 123/41.21 |
| 5,413,279 | A * | 5/1995 | Quaas | B60H 1/032 123/142.5 R |
| 7,278,473 | B2 * | 10/2007 | Brunner | F01N 3/0205 165/158 |
| 2006/0108017 | A1 * | 5/2006 | Nakajima | B21C 37/06 138/149 |
| 2009/0020097 | A1 * | 1/2009 | Theilemann | F02B 27/0252 123/184.42 |
| 2010/0050516 | A1 * | 3/2010 | Murakami | C10J 3/482 48/113 |
| 2010/0139603 | A1 * | 6/2010 | Theilemann | F02B 27/0252 123/184.47 |
| 2011/0247318 | A1 | 10/2011 | Kuroyanagi et al. | |
| 2013/0098314 | A1 * | 4/2013 | Imran | F02B 43/12 123/3 |
| 2013/0119667 | A1 * | 5/2013 | Christensen | B01D 53/1475 290/52 |
| 2015/0267637 | A1 * | 9/2015 | Kuroyanagi | F28F 9/02 165/52 |

FOREIGN PATENT DOCUMENTS

| | | | |
|---|---|---|---|
| JP | S58135313 | A | 8/1983 |
| JP | H03113291 | A | 5/1991 |
| JP | 2003106785 | A | 4/2003 |
| JP | 2011232020 | A | 11/2011 |

OTHER PUBLICATIONS

Office Action mailed Jul. 28, 2015 in corresponding JP Application No. 2012-262210 with English translation.

* cited by examiner

EXHAUST GAS HEAT EXCHANGING DEVICE

CROSS REFERENCE TO RELATED APPLICATIONS

This application is a U.S. National Phase Application under 35 U.S.C. 371 of International Application No. PCT/JP2012/007890 filed on Dec. 11, 2012 and published in Japanese as WO 2013/094149 A1 on Jun. 27, 2013. This application is based on Japanese Patent Applications No. 2011-277501 filed on Dec. 19, 2011, and No. 2012-262210 filed on Nov. 30, 2012. The disclosures of all of the above applications are incorporated herein by reference.

TECHNICAL FIELD

This disclosure relates to an exhaust gas heat exchanging device which performs a heat exchange between an exhaust gas discharged from an internal combustion engine and a cooling fluid.

BACKGROUND ART

Patent Literature 1 discloses an exhaust gas heat exchanging device having a casing in which a heat exchanging core is accommodated. The heat exchanging core is configured to have a plurality of laminated tubes through which an exhaust gas flows. The casing has an inlet port through which a cooling water is introduced in a direction orthogonal to a longitudinal direction, and an outlet port through which the cooling water is discharged in the same orthogonal direction, in the vicinity of both end portions of the tubes in the longitudinal direction. The casing further has an exhaust gas inflow portion and an exhaust gas outflow portion in a tank portion that is positioned on a further outer side than both of the end portions of the plurality of tubes in the longitudinal direction. A core plate holds the plurality of tubes in both of the end portions in the longitudinal direction and partitions a cooling water passage and the tank portion from each other. The core plate is bonded to joint portions that form the tank portion. Accordingly, the core plate is in contact with the cooling water and the joint portions are in contact with the exhaust gas.

According to the above-described configuration, the exhaust gas that flows into the casing from the exhaust gas inflow portion flows through the plurality of tubes therein after passing through an inner portion of the joint portion on one end side. The exhaust gas that flows out from the plurality of tubes passes through an inner portion of the joint portion on the other side, and then is discharged from the exhaust gas outflow portion. When the exhaust gas flows through the plurality of tubes, heat exchange is performed between the exhaust gas and the cooling water that flows through the cooling water passage in the vicinity of the plurality of tubes from the inlet port toward the outlet port. Accordingly, the exhaust gas is cooled by the cooling water only in the heat exchanging core.

PRIOR ART LITERATURES

Patent Literature

Patent Literature 1: JP-A-2003-106785

SUMMARY OF INVENTION

In the exhaust gas heat exchanging device shown in Patent Literature 1, a heat exchange performance in the heat exchanging core needs to be increased in order to ensure an increase of an exhaust gas cooling performance. Accordingly, a heat exchange surface area has to be increased and the heat exchanging core has to be increased in size by increasing the number of tubes or increasing the length of the tubes in the longitudinal direction.

Since the high-temperature exhaust gas flows through the inner portions of the joint portions, the temperature of the joint portions increases. The core plate is cooled by the cooling water, and thus a difference in temperature between the core plate and the joint portion increases. Accordingly, the difference in temperature increases a difference in thermal expansion between the core plate and the joint portion, and a large thermal stress is generated in a connection portion between both of the members such that higher strength is required in the connection portion.

An object of this disclosure is to provide an exhaust gas heat exchanging device that ensures an exhaust gas cooling performance and is reduced in size.

Means for Solving the Problems

According to the present disclosure, in order to achieve the above object, following technical means are employed.

According to a first disclosure, an exhaust gas heat exchanging device is provided with a heat exchanging core including a plurality of tubes through which an exhaust gas discharged from an internal combustion engine flows therein, the heat exchanging core defining a first water passage therearound, through which a cooling water flows;

an upstream-side gas tank portion configured to form a passage which communicates with the plurality of tubes therein on a further upstream-side of the exhaust gas than the plurality of tubes;

a downstream-side gas tank portion configured to form a passage which communicates with the plurality of tubes therein on a further downstream-side of the exhaust gas than the plurality of tubes;

a water tank portion configured to form the first water passage by surrounding the plurality of tubes, the water tank portion forming a second water passage which communicates with the first water passage around the upstream-side gas tank portion;

a double pipe portion including an inside pipe and an outside pipe, the inside pipe forming a gas passage which communicates with an inner portion of the upstream-side gas tank portion such that the exhaust gas flows through the gas passage, the double pipe portion forming an annular water passage which communicates with the second water passage between the inside pipe and the outside pipe such that the cooling water flows through the annular water passage;

a water inflow portion connected to the outside pipe, through which the cooling water flows into the annular water passage; and a water outflow portion connected to the water tank portion, through which the cooling water flows out from the first water passage.

According to the above disclosure, the exhaust gas can be cooled in not only the heat exchanging core but also the double pipe portion arranged on the upstream-side thereof and the like. Accordingly, an exhaust gas cooling performance can be significantly improved when compared to the devices of the related art. Further, in addition to the heat exchanging core, since there is a portion which is capable of cooling the exhaust gas, a heat exchange area can be reduced in the heat exchanging core and an entire EGR cooler can be reduced in size.

According to a second disclosure, the water tank portion includes a first split body and a second split body which are assembled face to face with each other in a direction crossing a direction in which the exhaust gas flows. Since the first split body and the second split body are assembled face to face with each other in the direction, the other members can be supported and connected together by the water tank portion through the assembly of the first split body and the second split body. As such, an exhaust gas heat exchanging device having excellent assembly efficiency can be provided.

According to a third disclosure, the upstream-side gas tank portion is connected to the inside pipe in such a manner as to be inserted into an inner side thereof with a first seal member interposed between the upstream-side gas tank portion and the inside pipe. The outside pipe is connected to the water tank portion in such a manner as to be inserted into an inner side thereof with a second seal member interposed between the outside pipe and the water tank portion.

According to this disclosure, mixture between the exhaust gas and the cooling water can be prevented in a connection portion between the upstream-side gas tank portion and the double pipe portion by using the simple configuration using the first seal member. The cooling water can be prevented from leaking in a connection portion between the water tank portion and the double pipe portion by using the simple configuration using the second seal member. For example, a fluid leakage prevention structure can be built without forming any coupling structure through brazing, bonding or the like in the connection portions.

According to a fourth disclosure, the double pipe portion is connected to the water tank portion and the upstream-side gas tank portion. The exchange gas heat exchanging device further comprises a ring member which is fitted into an outer circumferential portion of the water tank portion connected with the outside pipe. The ring member supports the water tank portion to tighten the water tank portion from outside.

According to this disclosure, a force of cramping the double pipe portion with the outer circumferential portion of the water tank portion can be reinforced by a tightening force of the ring member. The water tank portion and the double pipe portion can be reliably bonded and bonding quality can be ensured.

According to a fifth disclosure, the exhaust gas heat exchanging device is provided with a header plate to which end portions of the respective tubes are connected. The upstream-side gas tank portion (6) is connected to the header plate (9). According to this disclosure, each of the tubes can be accurately positioned, and a gap in a bonding portion between the tube and another member can be avoided. Accordingly, leakage of the exhaust gas from the gas passage can be suppressed.

According to a sixth disclosure, end portions of the plurality of tubes are connected to the upstream-side gas tank portion and supported by the upstream-side gas tank portion. Both the upstream-side gas tank portion and the tube are reliably cooled by the cooling water, and thus a difference in temperature between both of the members can be reduced. Accordingly, thermal stress that is attributable to the difference in temperature between both of the members can be suppressed, and product strength can be ensured.

EMBODIMENTS FOR CARRYING OUT INVENTION

Figure 1:
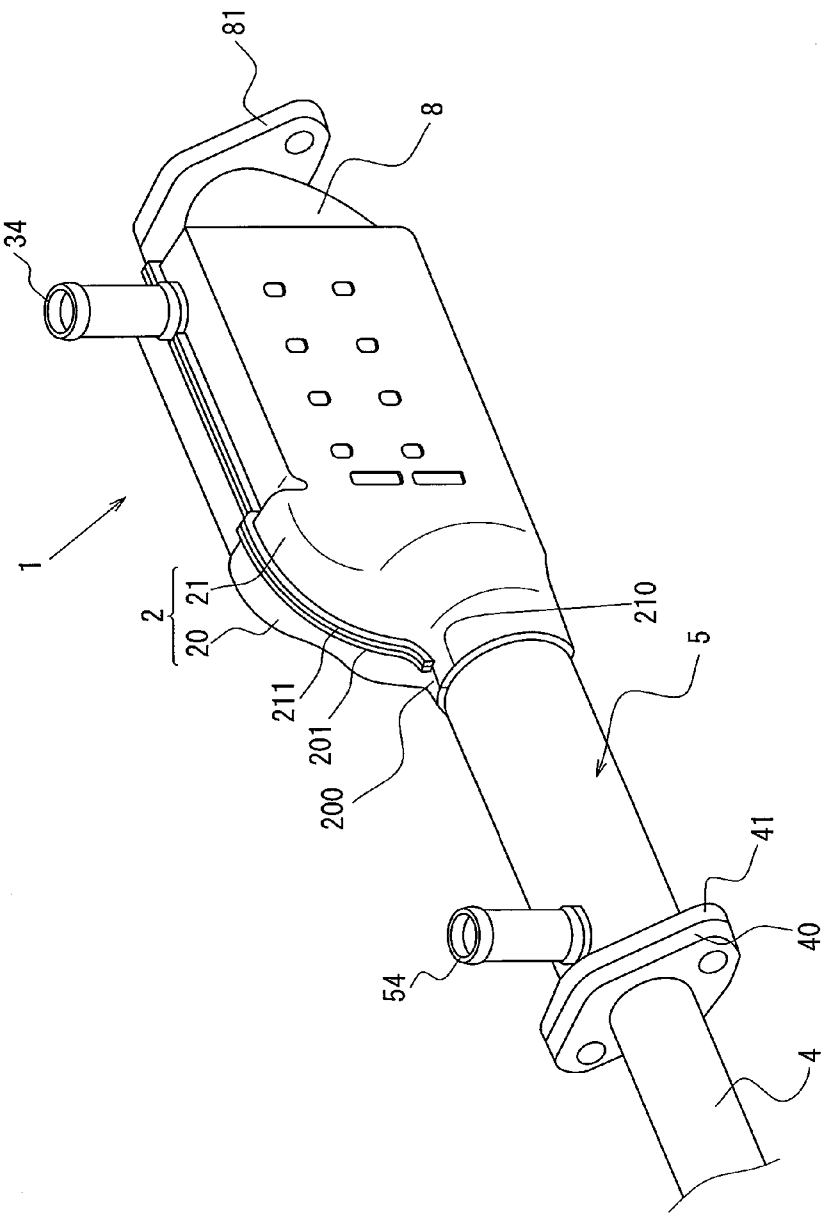
FIG. 1 is a perspective view showing an exhaust gas cooler according to a first embodiment to which this disclosure is applied.

Hereinafter, a plurality of embodiments of this disclosure will be described with reference to the accompanying drawings. Same reference numerals may be used to indicate parts corresponding to those already described in the preceding embodiment so that redundant description is omitted. In a case where only a part of the configuration is described in any of the embodiments, the already described configuration of the preceding embodiment can be applied to the other part. The embodiments can be partially combined with each other, although not clarified, if such combination entails no particular problem. Needless to say, parts of any of the embodiments that are specifically clarified to be capable of being combined with each other can be combined with each other.

First Embodiment

A first embodiment to which an exhaust gas heat exchanging device according to this disclosure is applied will be described with reference to FIGS. 1 to 4. The exhaust gas heat exchanging device according to the first embodiment is applied to an EGR cooler 1 of an exhaust gas recirculation device (EGR device) of an internal combustion engine such as a diesel engine and a gasoline engine for a vehicle.

The EGR cooler 1 is an exhaust gas heat exchanging device that cools an exhaust gas that is recirculated to an intake passage of an engine by using a cooling water as an engine coolant. The EGR cooler 1 is provided with a heat exchanging core 3 that has a plurality of tubes 7 therein, a water tank portion 2, an upstream-side gas tank portion 6, a downstream-side gas tank portion 8, a water inflow pipe 54, a water outflow pipe 34, a double pipe portion 5, and the like. Each of the members is formed of, for example, an aluminum material, an aluminum alloy material, a stainless steel material or the like that is light in weight and is excellent in thermal conductivity, and abutting portions of the respective members are bonded by brazing or welding.

The heat exchanging core 3 has the plurality of tubes 7 through which the exhaust gas discharged from the engine flows therein, and a first water passage 33, through which the cooling water flows, is disposed in the vicinity of the plurality of tubes 7. An inner fin may be arranged in each of the tubes 7.

The tube 7 is formed, for example, by bonding two tube plates, and the exhaust gas flows through the tube 7 therein. Each of the tube plates is formed from a flat plate to have a U-shaped cross section by pressing or rolling. Opening sides of the tube plates are bonded to each other, and thus the tubes 7 are formed into elongated pipe members, and transverse sections thereof crossing a longitudinal direction form a flat rectangular shape. Rectangular opening portions 70 are formed at both ends of each of the tubes 7 in the longitudinal direction.

The plurality of tubes 7 are formed to be laminated such that tube base surfaces 71, which are long sides of the flat rectangular cross sections, face each other. On the tube base surfaces 71, a plurality of convex-shaped portions 71*a* are formed as temperature reducing means that reduces the temperature of a temperature boundary layer of the cooling water on outer surfaces of the tubes 7. The plurality of convex-shaped portions 71*a* can be set, for example, as cylindrical convex-shaped portions, and are arranged in a grid shape. Further, a rectification unit 71*b* is disposed on an exhaust gas flow upstream-side of the tube base surface 71 so as to expand the flow of the cooling water to the entire tube base surface 71. The rectification unit 71*b* is shaped to protrude from the tube base surface 71.

Figure 2:
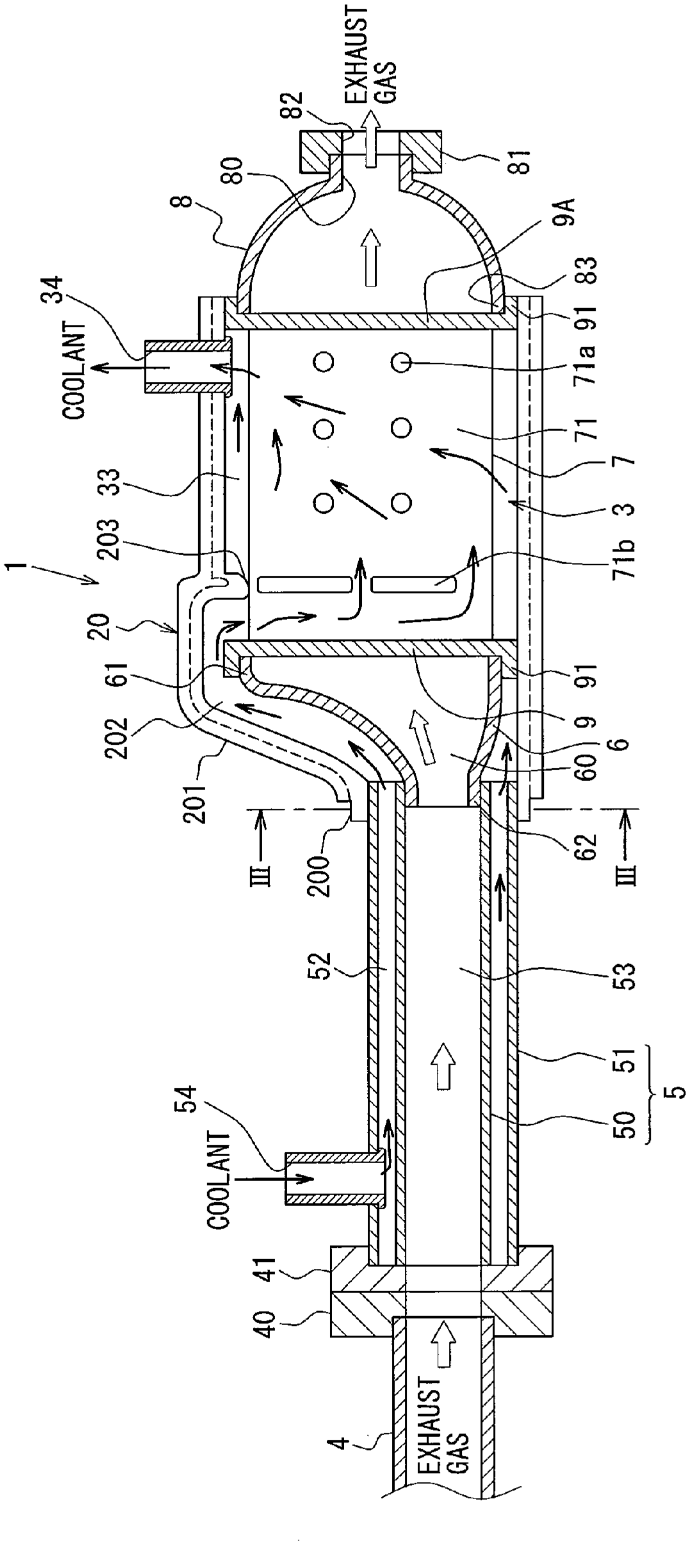
FIG. 2 is a cross-sectional view showing an internal configuration of the exhaust gas cooler according to the first embodiment.
Figure 3:
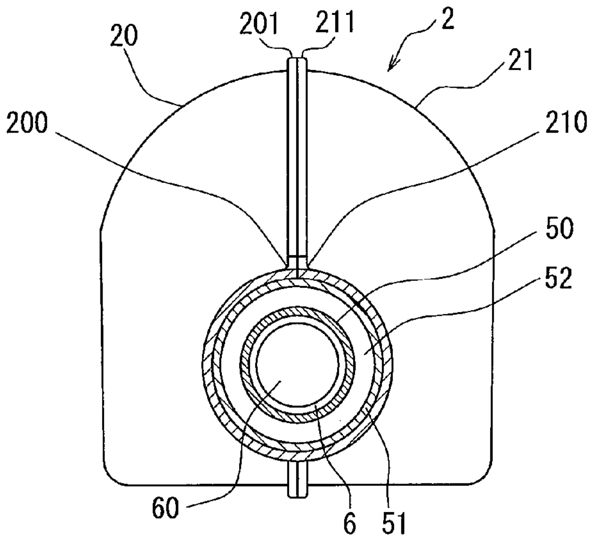
FIG. 3 is a cross-sectional arrow view taken along line III-III of FIG. 1.
Figure 4:
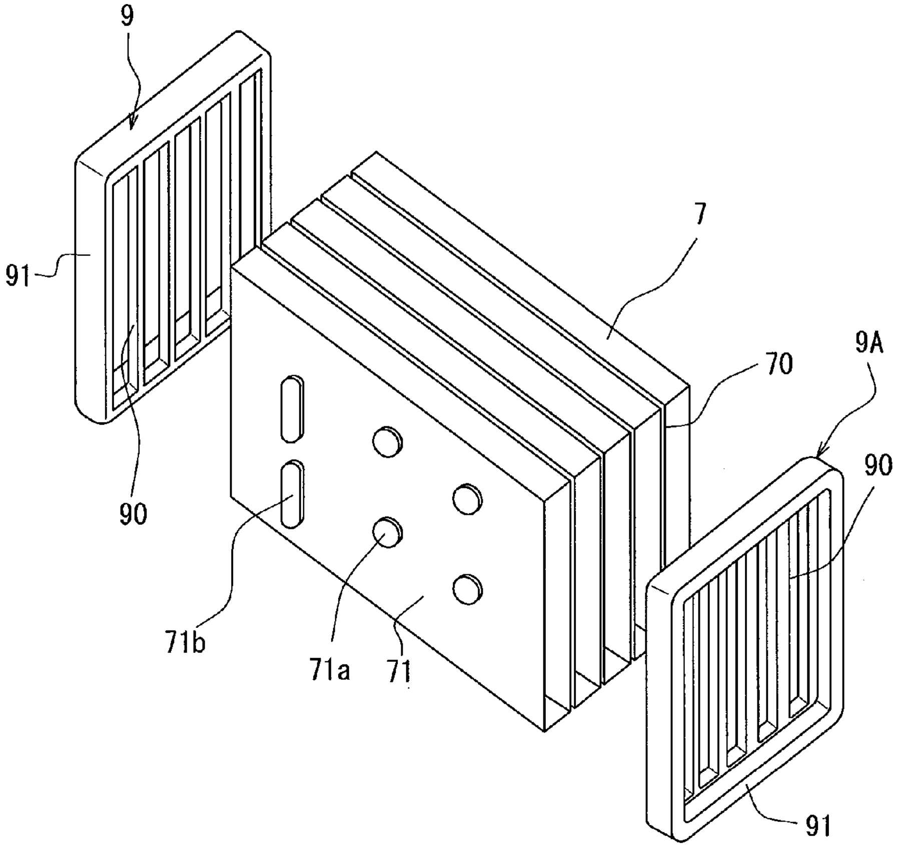
FIG. 4 is an exploded perspective view showing a plurality of tube through which exhaust gas flows and a header plate.

As shown in FIGS. 2 and 4, header plates 9 and 9A are supporting-members for the tubes 7, and are respectively disposed in both end portions of the tube 7 in the longitudinal direction. The header plate 9 is arranged on the exhaust gas flow upstream-side, and the header plate 9A is arranged on the exhaust gas flow upstream-side. Tube holes 90, where end portions of the tubes 7 in the longitudinal direction pass through a quadrangular member, and vertical edge portions 91, where plate surface directions of outer edge portions are bent by approximately 90 degrees inside, are formed in the header plates 9 and 9A. The respective end portions of the tubes 7 in the longitudinal direction are brazed and bonded while passing through the tube holes 90 of the respective header plates 9 and 9A.

The respective tubes 7 are laminated in such a manner as to be directly supported by the header plates 9 and 9A, and thus a dimension between the tubes is maintained appropriately during the brazing and the bonding, and the occurrence of a gap that is not bonded is prevented between an outer circumferential surface of the end portion of the tube 7 and an inner surface of the tube hole 90. Also, a sufficient quality of the brazing and the bonding between the tube 7 and each of the members can be ensured.

As shown in FIG. 2, a part of the vertical edge portion 91 of the header plate 9 that is positioned in a lower portion is bonded to an inner surface of the water tank portion 2. A part that is positioned in an upper portion is not bonded to the inner surface of the water tank portion 2, but is arranged to have a predetermined gap. The header plate 9A is arranged such that an entire circumference of the vertical edge portion 91 is bonded to the inner surface of the water tank portion 2. In this manner, the first water passage 33 and a second water passage 202 in the water tank portion 2 and a gas passage in the downstream-side gas tank portion 8 are blocked and partitioned from each other. Accordingly, the cooling water that flows through the first water passage 33 is blocked not to leak into the gas passage in the downstream-side gas tank portion 8.

The water tank portion 2 is a cylindrical container body, in which the plurality of laminated tubes 7 are accommodated, and is formed from a first split body 20 and a second split body 21. The first split body 20 and the second split body 21, which have the same shape, are members that split the water tank portion 2 into two in a direction crossing the longitudinal direction of the tube 7 and have substantially C-shaped transverse sections. In other words, joint portions of the first split body 20 and the second split body 21 are central positions of the water tank portion 2 with regard to the direction crossing the longitudinal direction of the tube 7. The longitudinal direction of the tube 7 is a direction that is consistent with a direction in which the tubes 7 are laminated and a direction in which the exhaust gas flows.

The water tank portion 2 is formed by combining the first split body 20 and the second split body 21 face to face each other. Semicircular cut-out portions are formed in the respective joint portions of the first split body 20 and the second split body 21, close to the end portions on the downstream-side of the exhaust gas, so as to pinch the water outflow pipe 34. Accordingly, the first split body 20 and the second split body 21 that are combined with each other can pinch the double pipe portion 5 in the end portion on the upstream-side of the exhaust gas, can pinch the water outflow pipe 34 and the header plate 9A in the end portion on the downstream-side of the exhaust gas, and can form the water tank portion 2 that has the heat exchanging core 3.

Respective outer circumferential portions that are the joint portions of the first split body 20 and the second split body 21 are brazed and bonded with plate-shaped end portions abutting against each other. During the brazing and the bonding of the first split body 20 and the second split body 21, a vertical edge portion 201 and a vertical edge portion 211 may be used to abut against each other, with the vertical edge portion 201 and the vertical edge portion 211 being bent by approximately 90 degrees to be open outside, in the respective outer circumferential portions of the first split body 20 and the second split body 21. In this case, a claw portion may be partially disposed in the vertical edge portion of either the first split body 20 or the second split body 21, the claw portion may be bent to cover the other vertical edge portion, and the brazing and the bonding may be performed after temporary fixing. In this manner, the water tank portion 2 is formed by bonding the two half-split members by brazing, welding, or the like.

An outer circumferential surface of a downstream-side open end portion 61 of the upstream-side gas tank portion 6 is fitted into an inner circumferential surface of the vertical edge portion 91 of the header plate 9 and is brazed and bonded. Likewise, an outer circumferential surface of an upstream-side open end portion 83 of the downstream-side gas tank portion 8 is fitted into an inner circumferential surface of the vertical edge portion 91 of the header plate 9A and is brazed and bonded.

A concave portion 203 that is recessed toward the tube 7 is formed on the inner surface of the water tank portion 2 that faces the tube 7. An inner surface of the concave portion 203 is brazed and bonded to the outer surface of the tube 7. Because of the concave portion 203, the cooling water flowing into the second water passage 202 flows in a downward direction in FIG. 2, spreads throughout the entire outer surfaces of the plurality of tubes 7, and is directed toward the water outflow pipe 34 which is connected to the upper right. Accordingly, it can be restricted that the cooling water in the second water passage 202 directly flows out from the water outflow pipe 34. In other words, the cooling water flowing into the water tank portion 2 flows in the water tank portion 2 without bias, and thus heat exchange between the cooling water and the exhaust gas is sufficiently performed with the heat exchanging core 3.

The double pipe portion 5 has an inside pipe 50, an outside pipe 51, and the water inflow pipe 54 that is connected to the outside pipe 51. The inside pipe 50 has a gas passage 53 formed therein, which communicates with a gas passage 60 in the upstream-side gas tank portion 6. An annular water passage 52 that communicates with the second water passage 202 is formed between the inside pipe 50 and the outside pipe 51. An opening portion for connection is formed in an outer circumferential surface of the outside pipe 51, close to the end portion on the upstream-side of the exhaust gas, such that the water inflow pipe 54 is fitted thereinto. Accordingly, a passage in the water inflow pipe 54 that functions as an inlet port for the cooling water communicates with the annular water passage 52, and is sequentially connected to the second water passage 202, the first water passage 33, and a passage in the water outflow pipe 34 that is an outlet port for the cooling water. A fin, a spiral groove, or the like for increasing heat exchange may be disposed in an outer circumferential surface of the inside pipe 50 or an inner circumferential surface of the outside pipe 51.

An upstream-side open end portion of the double pipe portion 5 is brazed and bonded in such a manner as to be internally fitted into a flange portion 41. The flange portion 41 is fastened and fixed to a flange portion 40, to which an exhaust gas pipe 4 is connected, by using a bolt.

The upstream-side gas tank portion 6 is a funnel-shaped member, and forms a gas passage that communicates with the plurality of tubes 7 therein on a further upstream-side of the exhaust gas than the plurality of tubes 7. The upstream-side gas tank portion 6 has the downstream-side open end portion 61 on the exhaust gas flow downstream-side, and an upstream-side open end portion 62 on the exhaust gas flow upstream-side. The upstream-side open end portion 62 is brazed and bonded in such a manner as to be internally fitted into the inside pipe 50 of the double pipe portion 5, and thus the upstream-side gas tank portion 6 and the double pipe portion 5 are connected. A downstream-side end portion of the exhaust gas in the inside pipe 50 of the double pipe portion 5 is clamped by the first split body 20 and the second split body 21. In this manner, the water tank portion 2 and the double pipe portion 5 are connected.

The downstream-side gas tank portion 8 is a funnel-shaped member, and forms a gas passage that communicates with the plurality of tubes 7. The downstream-side gas tank portion 8 has a downstream-side open end portion 80 on the exhaust gas flow downstream-side, and the upstream-side open end portion 83 on the exhaust gas flow upstream-side. The downstream-side open end portion 80 is brazed and bonded in such a manner as to be internally fitted into a flange portion 81. The flange portion 81 is a plate member that has a diamond-shaped external shape, and a communication port 82 is formed in a central portion thereof and female screw holes are formed on both ends thereof for fastening with a bolt. The communication port 82 communicates with an inner portion of an exhaust gas pipe (not shown). The communication port 82 functions as an outlet port through which the exhaust gas is discharged outside.

Accordingly, a passage in the exhaust gas pipe 4 is sequentially connected to the gas passage 53 in the inside pipe 50, the gas passage 60 in the upstream-side gas tank portion 6, gas passages in the plurality of tubes 7, a gas passage in the downstream-side gas tank portion 8, and a passage in the exhaust gas pipe that is connected to the flange portion 81.

According to the EGR cooler 1 that has the above-described configuration, a part of the exhaust gas that is discharged from the engine flows through gas passages in the plurality of tubes 7 from a gas passage in the exhaust gas pipe 4 through the gas passage 53 in the inside pipe 50 and the gas passage 60 in the upstream-side gas tank portion 6, and flows out from the gas passage in the downstream-side gas tank portion 8 and the flange portion 81. Then, the exhaust gas that flows out of the EGR cooler 1 is suctioned back into the engine.

The cooling water for the engine flows into an upstream-side end portion of the annular water passage 52 from the water inflow pipe 54, flows through the second water passage 202 and the first water passage 33 arranged between the water tank portion 2 and the upstream-side gas tank portion 6, and flows out from the water outflow pipe 34 which is arranged in a downstream-side end portion of the water tank portion 2. Heat exchange is performed in the EGR cooler 1 between the exhaust gas and the cooling water in three places, that is, when the exhaust gas flows through the double pipe portion 5, when the exhaust gas flows through the gas passage 60, and when the exhaust gas flows through passages in the plurality of tubes 7. Accordingly, the exhaust gas is suctioned into the engine after being sufficiently cooled, and thus contributes to a response to exhaust gas regulations, fuel efficiency improvement, and the like.

Hereinafter, an operation and an effect of the EGR cooler 1 according to this embodiment will be described. The EGR cooler 1 includes the heat exchanging core 3 that has the plurality of tubes 7 and the first water passage 33, the upstream-side gas tank portion 6 and the downstream-side gas tank portion 8 that are respectively arranged on the upstream-side and the downstream-side to communicate with the tubes 7 therein, the water tank portion 2 that forms the first water passage 33 and forms the second water passage 202, which communicates with this water passage, in the vicinity of the upstream-side gas tank portion 6, the double pipe portion 5 that forms the gas passage 53, which communicates with an inner portion of the upstream-side gas tank portion 6, in the inside pipe 50 and forms the water passage 52, which communicates with the second water passage 202, between the inside pipe 50 and the outside pipe 51, the water inflow pipe 54 that is connected to the outside pipe 51 such that the cooling water flows into the water passage 52, and the water outflow pipe 34 that is connected to the water tank portion 2 such that the cooling water flows out from the first water passage 33.

According to this configuration, heat exchange is performed between the cooling water that flows through the water passage 52 and the exhaust gas that flows through the gas passage 53, in the double pipe portion 5. Furthermore, heat exchange is performed between the cooling water that flows through the second water passage 202 in the water tank portion 2 and the exhaust gas that flows through the gas passage 53. In other words, a structure in which the exhaust gas can be cooled by not only the heat exchanging core 3 but also the gas passage on the upstream-side is provided, and thus a greater sufficient exhaust gas cooling performance can be ensured than in the device of the related art described in Patent Literature 1. Furthermore, not only the heat exchanging core 3 but also the additional places at which the exhaust gas can be cooled are provided, and thus a heat exchange area of the heat exchanging core 3 can be reduced. For example, the heat exchanging core 3 can be reduced in size by reducing the number of the tubes 7 or shortening the total length of the tube 7. Accordingly, the height and the width of the EGR cooler 1 can be decreased for reduction in product size.

According to the EGR cooler 1, the temperature of the exhaust gas is reduced, because of heat exchange between the cooling water and the exhaust gas that flows through the gas passage 53 in the inside pipe 50, when the cooling water flows through the water passage 52 between the inside pipe 50 and the outside pipe 51. In this manner, the temperature of the inside pipe 50 is also reduced, and thus the durability of the inside pipe 50 can be improved. Furthermore, a thermal expansion that is attributable to the high-temperature exhaust gas flowing therein can be suppressed since the temperature of the inside pipe 50 is reduced.

Likewise, in the upstream-side gas tank portion 6 that is bonded to the inside pipe 50, the cooling water that flows through the second water passage 202 allows the temperature of the exhaust gas which flows therein to be reduced and the temperature of the upstream-side gas tank portion 6 itself to be reduced. Accordingly, a difference in temperature between the inside pipe 50 and the upstream-side gas tank portion 6 is suppressed, and thermal stress that is attributable to a thermal expansion is reduced. In this manner, thermal stress is reduced in every bonding portion of the EGR cooler 1 to contribute greatly to product durability improvement.

An EGR cooler is subjected to a constraint that the EGR cooler has to be installed close to an engine. However, the EGR cooler 1 of this embodiment has a great effect in improving the mountability. According to the EGR cooler 1 of this embodiment, the improved exhaust gas cooling performance of the EGR cooler is expected to result in a great effect in responding to the strengthening of exhaust gas regulations on diesel engines and in responding to an increasing demand for higher fuel efficiency of gasoline engines.

The water tank portion 2 is configured to have the first split body 20 and the second split body 21 that are assembled face to face with each other in the direction crossing the direction in which the exhaust gas flows. According to this configuration, the double pipe portion 5, the downstream-side gas tank portion 8, and the like can be supported by the water tank portion 2 by assembling the first split body 20 and the second split body 21. Accordingly, the other members can be supported and connected together by the water tank portion 2 through the assembly of the first split body 20 and the second split body 21. As such, a product having excellent assembly efficiency can be provided.

Second Embodiment

Figure 5:
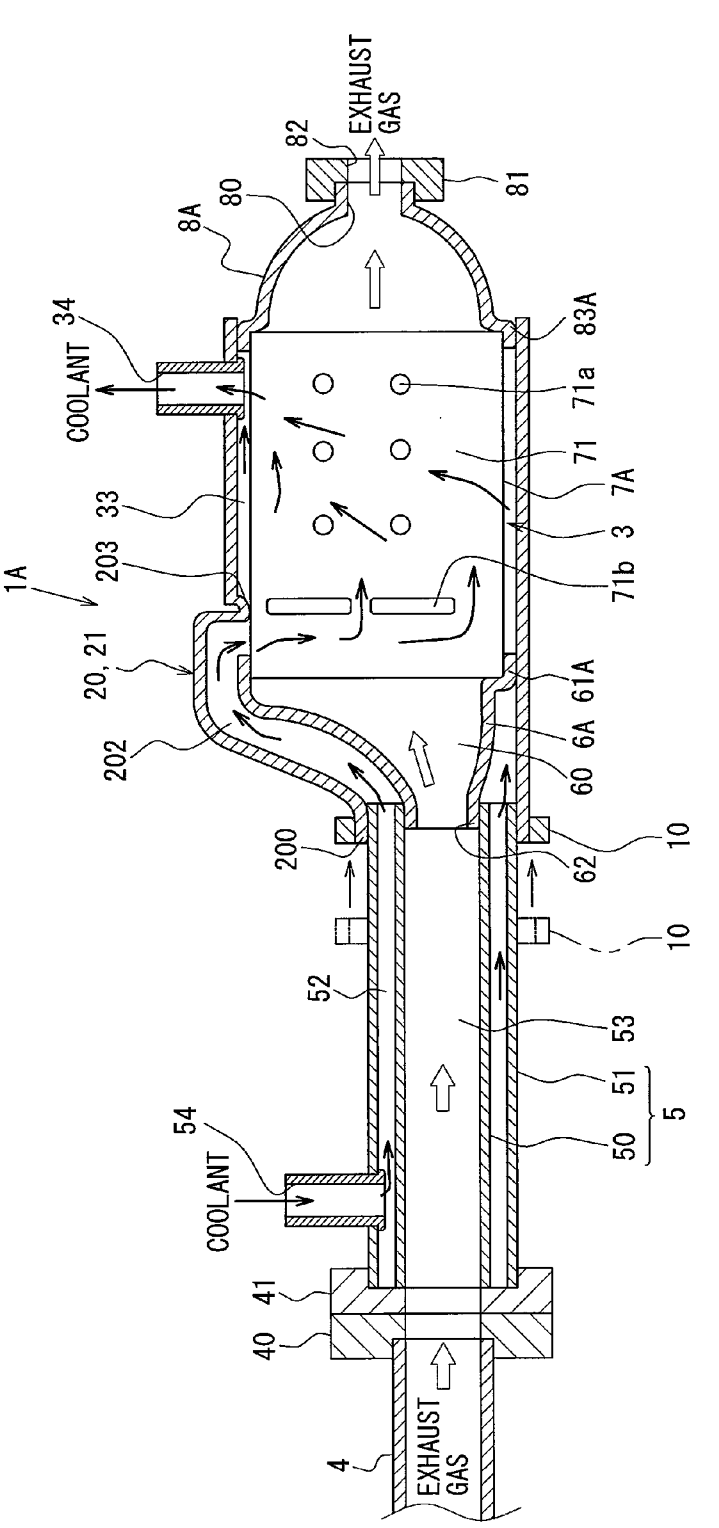
FIG. 5 is a cross-sectional view showing an internal configuration of an exhaust gas cooler according to a second embodiment to which this disclosure is applied.

In a second embodiment, an EGR cooler 1A, which is different from the first embodiment, will be described with reference to FIGS. 5 and 6. Components and configuration that is not described in the second embodiment, for which the drawings associated with the first embodiment and the same reference numerals are used, are the same as in the first embodiment and have the same operation and effect. In FIG. 5, the vertical edge portions 201 and 211 are not shown so as to describe the water tank portion 2 which is tightened by a ring member 10.

Figure 6:
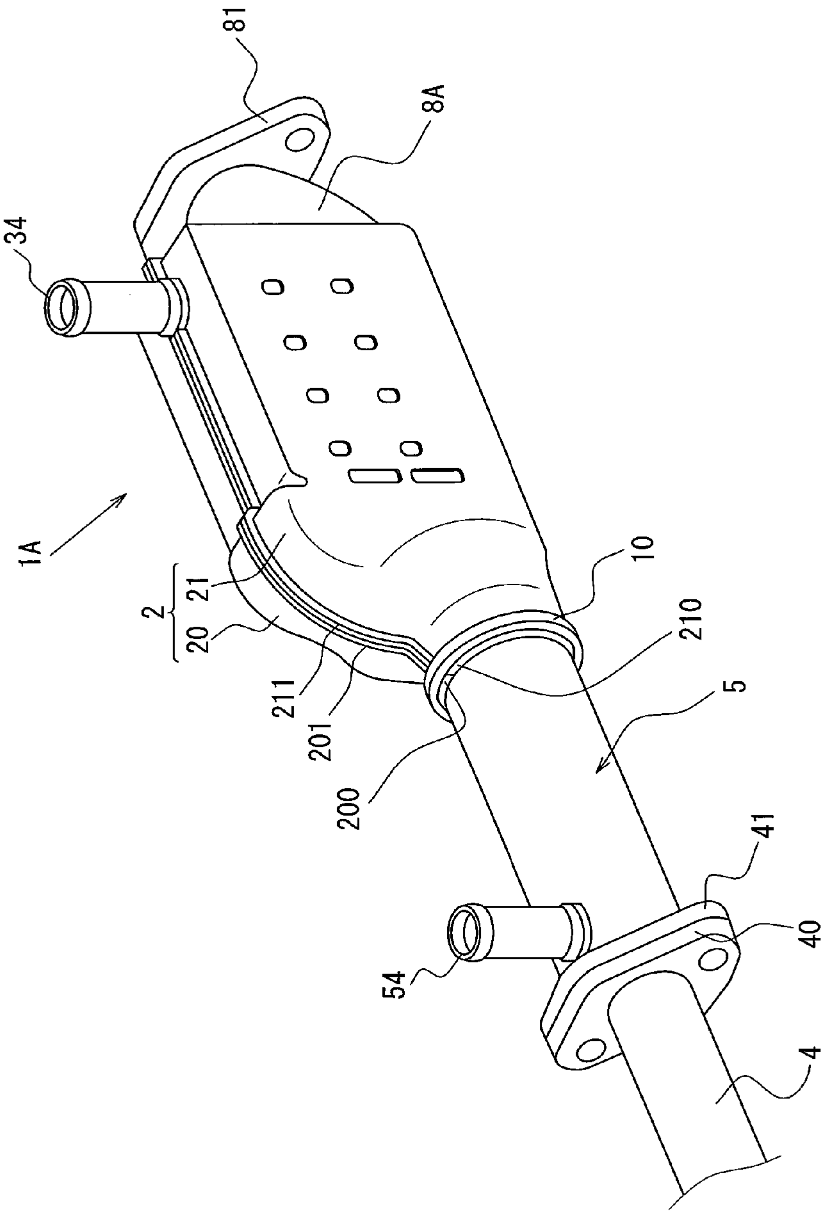
FIG. 6 is a perspective view showing the exhaust gas cooler according to the second embodiment.

As shown in FIGS. 5 and 6, the EGR cooler 1A is different from the EGR cooler 1 in that the EGR cooler 1A has a configuration in which the first split body 20 and the second split body 21, which are combined face to face with each other, are supported to be tightened at a predetermined position and in terms of a structure that supports a plurality of tubes 7A. In other words, the EGR cooler 1A includes the ring member 10 that is fitted into an outer circumferential portion 200 of the water tank portion which is positioned at a site connected with the outside pipe 51. The plurality of tubes 7A that form a laminated body of tubes are supported with outer circumferential surfaces in end portions thereof in the longitudinal direction being connected to an inner circumferential surface of an upstream-side gas tank portion 6A.

The outer circumferential surfaces of the plurality of laminated tubes 7A are brazed and bonded, in end portions of the exhaust gas flow upstream-side, with an inner circumferential surface of a downstream-side open end portion 61A of the upstream-side gas tank portion 6A being fitted. Likewise, outer circumferential surfaces of the tubes 7A in end portions on the exhaust gas flow downstream-side are brazed and bonded with an inner circumferential surface of an upstream-side open end portion 83A of a downstream-side gas tank portion 8A being fitted. A part of the downstream-side open end portion 61A of the upstream-side gas tank portion 6A that is positioned in a lower portion is bonded to the inner surface of the water tank portion 2. A part that is positioned in an upper portion is not bonded to the inner surface of the water tank portion 2, but is arranged to have a predetermined gap. An entire circumference of an outer circumferential surface of the upstream-side open end portion 83A of the downstream-side gas tank portion 8A is bonded to the inner surface of the water tank portion 2.

The outer circumferential portion 200 of the water tank portion is an outer circumferential portion that is positioned in an end portion of the water tank portion 2 on the exhaust gas flow upstream-side, and has a dimension and a shape such that an inner circumferential surface thereof is in close contact with the outer circumferential surface of the outside pipe 51. The inner diameter dimension of an inner circumferential surface of the ring member 10 is set to be almost equal to or slightly smaller than the outer diameter dimension of the outer circumferential portion 200 of the water tank portion. The ring member 10 is formed, for example, of an aluminum material, an aluminum alloy material, a stainless steel material, or the like.

Before the ring member 10 is attached to the water tank portion 2, the double pipe portion 5 is inserted in advance into an inner side of the ring member 10 as shown by a two-dot chain line in FIG. 5. Then, the double pipe portion 5 in this state is pinched by the first split body 20 and the second split body 21 that are combined face to face with each other. Next, the ring member 10 shown by the two-dot chain line in FIG. 5 is moved toward a water tank portion 2, and the inner circumferential surface of the ring member 10 is fitted into the outer circumferential portion 200 of the water tank portion. In this manner, the ring member 10 supports the water tank portion 2 to tighten the water tank portion 2 from outside, and thus the degree of close contact in the joint portions of the first split body 20 and the second split body 21 is increased. In a state where the degree of close contact of the joint portions is increased, abutting parts of the vertical edge portion 201 and the vertical edge portion 211 are brazed and bonded. Accordingly, bonding strength of the first split body 20 and the second split body 21 can be improved and the EGR cooler 1A can be provided with excellent durability.

According to the above-described configuration, the EGR cooler 1A includes the ring member 10 that is fitted into the outer circumferential portion 200 of the water tank portion which is positioned at the site connected with the outside pipe 51. The ring member 10 functions as a reinforcing member that increases the bonding strength of the first split body 20 and the second split body 21. According to this configuration, a force of pinching the double pipe portion 5 with the outer circumferential portion 200 of the water tank portion can be ensured and reinforced by a tightening force of the ring member 10. Accordingly, bonding quality can be ensured during the bonding such as brazing and welding.

The end portions of the plurality of tubes 7A are connected to the upstream-side gas tank portion 6A and supported, and thus both the upstream-side gas tank portion 6A and the tubes 7A are reliably cooled by the cooling water that flows through the second water passage 202. As such, a difference in temperature between both of the members can be reduced. Accordingly, the difference in temperature between both of the members is decreased and thermal stress is suppressed such that bonding strength can be ensured between both of the members.

Third Embodiment

In a third embodiment, an EGR cooler 1B, which is different from the first embodiment, will be described with reference to FIG. 7. Components and configuration that is not described in the third embodiment, for which the drawings associated with the first embodiment and the same reference numerals are used, are the same as in the first embodiment and have the same operation and effect.

Figure 7:
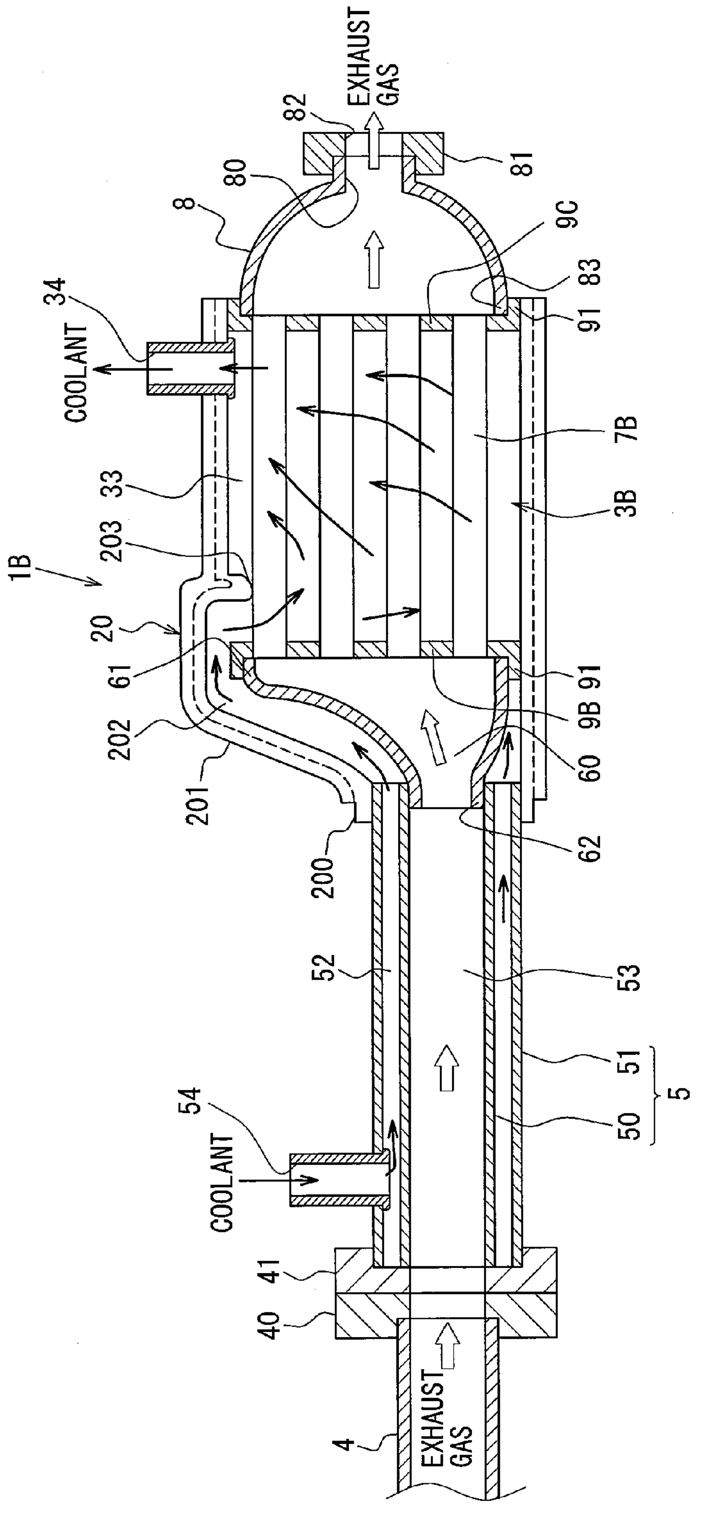
FIG. 7 is a cross-sectional view showing an internal configuration of an exhaust gas cooler according to a third embodiment to which this disclosure is applied.

As shown in FIG. 7, the EGR cooler 1B is different from the EGR cooler 1 in the configuration of a plurality of tubes 7B. The plurality of tubes 7B, which are different from the tubes 7 of the first embodiment, are not tubes vertically long in an up-down direction, but are tubes that are arranged side by side in the up-down direction. The tubes 7B have, for example, annular transverse sections. The respective tubes 7B having this shape are supported by a header plate 9B and a header plate 9C while both end portions in the longitudinal direction pass through tube holes. The tubes 7B are formed, for example, of an aluminum material, an aluminum alloy material, a stainless steel material, or the like.

Fourth Embodiment

In a fourth embodiment, an EGR cooler 1C, which is different from the first embodiment, will be described with reference to FIG. 8. Components and configuration that is not described in the fourth embodiment, for which the drawings associated with the first embodiment and the same reference numerals are used, are the same as in the first embodiment and have the same operation and effect.

Figure 8:
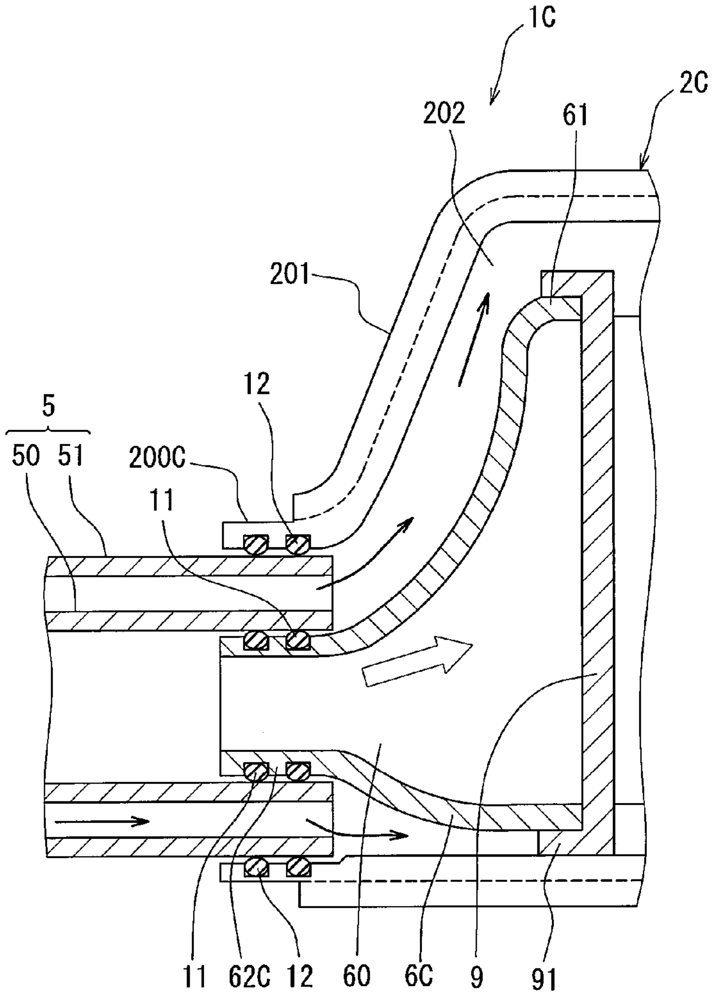
FIG. 8 is a cross-sectional view of an exhaust gas cooler according to a fourth embodiment to which this disclosure is applied, which shows a connection relationship between a double pipe portion, a water tank portion, and an upstream-side gas tank portion.

As shown in FIG. 8, two O-rings 11, which are examples of a first seal member, are arranged side by side with a predetermined gap in an axial direction in an upstream-side open end portion 62C that is positioned on the upstream-side of an upstream-side gas tank portion 6C. The respective O-rings 11 are fitted into grooves that are formed on an entire circumference of an outer circumferential surface of the upstream-side open end portion 62C. Each of the O-rings 11 protrudes more outwards than the outer circumferential surface of the upstream-side open end portion 62C in such a manner as to be fitted into the groove.

Two O-rings 12, which are examples of a second seal member, are inscribed side by side with a predetermined gap in the axial direction in an outer circumferential portion 200C that is positioned on the upstream-side of water tank portion. The outer circumferential portion 200C of the water tank portion is an outer circumferential portion that is positioned in an end portion of a water tank portion 2C on the exhaust gas flow upstream-side. The respective O-rings 12 are fitted into grooves that are formed on an entire circumference of an inner circumferential surface of the outer circumferential portion 200C of the water tank portion. Each of the O-rings 12 protrudes more inwards than the inner circumferential surface of the outer circumferential portion 200C of the water tank portion in such a manner as to be fitted into the groove.

The O-rings 11 and the O-rings 12 are members that are easily elastically deformed by receiving an external force. The O-rings 11 and the O-rings 12 can be formed of an elastomer such as various types of rubbers. The number of the O-rings 11 and the number of the O-rings 12 disposed in the axial direction may be one or three or more. The O-rings 11 and the O-rings 12 may be respectively inserted into the respective grooves that are formed in the inner circumferential surface of the inside pipe 50 and the outer circumferential surface of the outside pipe 51.

According to the above-described configuration, the upstream-side open end portion 62C is internally fitted into the inside pipe 50 and the outside pipe 51 is internally fitted into the outer circumferential portion 200C of the water tank portion such that the upstream-side gas tank portion 6C and the water tank portion 2 are connected with the double pipe portion 5. In this case, the respective O-rings 11 are in close contact with the groove formed in the upstream-side open end portion 62C and the inner circumferential surface of the inside pipe 50 in an elastically deformed state, and prevent the exhaust gas from leaking to the second water passage 202 and prevent the cooling water from leaking to the gas passage 53. The respective O-rings 12 are in close contact with the groove formed in the outer circumferential portion 200C of the water tank portion and the outer circumferential surface of the outside pipe 51 in an elastically deformed state, and prevent the cooling water from leaking outside.

According to the EGR cooler 1C of the fourth embodiment, the upstream-side gas tank portion 6C is connected in such a manner as to be inserted into an inner side of the inside pipe 50, and the O-rings 11 are interposed between the upstream-side gas tank portion 6C and the inside pipe 50. Furthermore, the outside pipe 51 is connected in such a manner as to be inserted into an inner side of a water tank portion 20C, and the O-rings 12 are interposed between the outside pipe 51 and the water tank portion 6C.

According to this configuration, mixture between the exhaust gas and the cooling water can be prevented in a connection portion between the upstream-side gas tank portion 6C and the double pipe portion 5 by using the simple configuration using the first O-rings 11. Furthermore, the cooling water can be prevented from leaking in the connection portion between the upstream-side gas tank portion 6C and the double pipe portion 5 by using the simple configuration using the second O-rings 12. According to this configuration, no coupling structure is formed through the brazing, the bonding, or the like in both of the connection portions, and thus manufacturing processes can be simplified and a highly reliable fluid leakage prevention structure can be built.

Fifth Embodiment

In a fifth embodiment, an EGR cooler 1D, which is different from the fourth embodiment, will be described with reference to FIG. 9. Components and configuration that is not described in the fifth embodiment, for which the drawings associated with the first embodiment and the fourth embodiment and the same reference numerals are used, are the same and have the same operation and effect.

Figure 9:
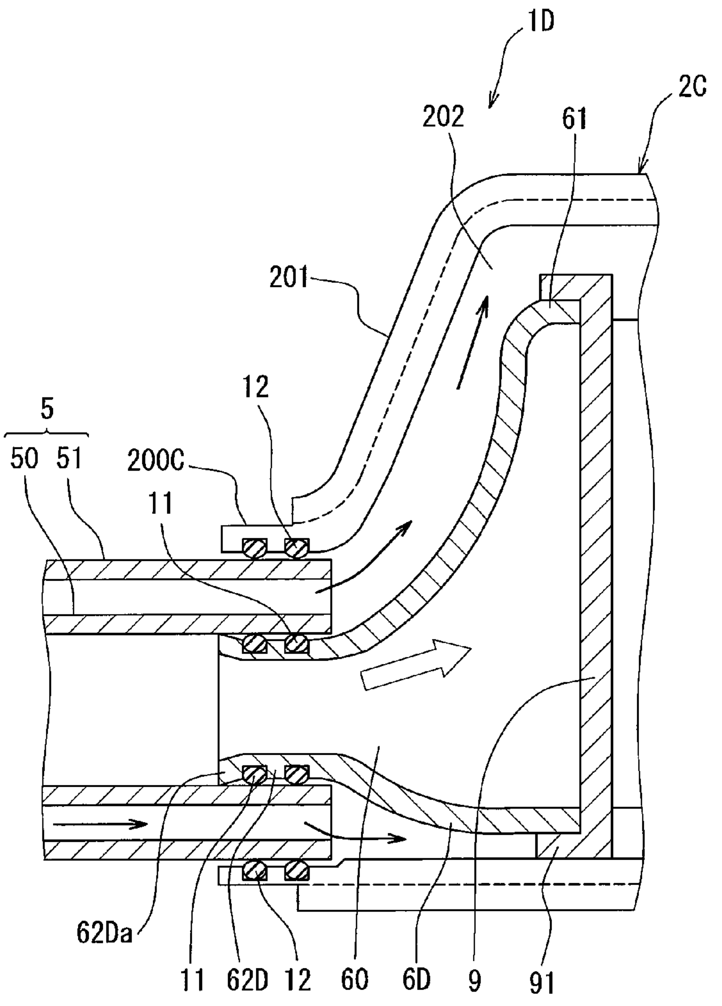
FIG. 9 is a cross-sectional view of an exhaust gas cooler according to a fifth embodiment to which this disclosure is applied, which shows a connection relationship between a double pipe portion, a water tank portion, and an upstream-side gas tank portion.

As shown in FIG. 9, an upstream-side open end portion 62D that is positioned on the upstream-side of an upstream-side gas tank portion 6D has an expanding pipe portion 62Da at a tip end thereof. The expanding pipe portion 62Da, on the downstream-side, is shaped to have an outer diameter dimension that expands more to a radially outer side than to a part of the upstream-side open end portion 62D which is internally fitted into the inside pipe 50. In other words, it is preferable that an outer circumference of the expanding pipe portion 62Da is closer to the inner circumferential surface of the inside pipe 50 than the other parts of the upstream-side open end portion 62D, and the expanding pipe portion 62Da have an outer diameter dimension enough to be in contact with the inner circumferential surface of the inside pipe 50.

According to the EGR cooler 1D of the fifth embodiment, the expanding pipe portion 62Da is positioned close enough to be in contact with the inner circumferential surface of the inside pipe 50. Accordingly, in a case where condensed water is generated on the inner circumferential surface of the inside pipe 50 that is positioned in the vicinity of the expanding pipe portion 62Da, penetration by the condensed water can be suppressed between the upstream-side open end portion 62D of the upstream-side gas tank portion 6D and the inner circumferential surface of the inside pipe 50. Because of this suppression effect, the condensed water can be prevented from remaining between the upstream-side open end portion 62D and the inner circumferential surface of the inside pipe 50 and corrosion of each of the portions can be suppressed, which contributes to the fulfillment of desired functions of the EGR cooler 1D for an extended period of time.

Other Embodiments

This disclosure is not limited to the above-described embodiments, and various modifications are possible without departing from the scope of this disclosure. The structures of the above-described embodiments are only examples, and the scope of this disclosure is not limited to the descriptions. The scope of this disclosure is clarified by the scope of claims, and includes any modification having the same significance and scope within the scope of claims.

The water tank portion 2 that is shown in FIG. 1 has the joint portions directed to extend upward and downward and is formed from the first split body 20 and the second split body 21 which are assembled face to face with each other in the above-described embodiments. However, this disclosure is not limited to the embodiment. For example, the joint portions of the first split body 20 and the second split body 21 may be joint portions directed to extend horizontally.

The above-described embodiments are not limited to the water tank portion 2 being configured to have only the first split body 20 and the second split body 21. The water tank portion 2 according to this disclosure may be formed by combining other members in addition to the first split body 20 and the second split body 21.

The first seal member and the second seal member of the above-described embodiments are not limited to the O-rings, and may be configured to be other seal members insofar as the seal member is deformed by receiving an external force and can form a predetermined seal structure.

The tube 7 is formed of the two tube plates in the above-described embodiments. However, without being limited thereto, the tube 7 may be formed of an integrated pipe member. The cross-sectional shape of the tube 7 is not limited to the flat rectangular shape, and may be any other shape such as a round shape.

The invention claimed is:

1. An exhaust gas heat exchanging device comprising:

a heat exchanging core including a plurality of tubes through which an exhaust gas discharged from an internal combustion engine flows, the heat exchanging core defining a first water passage, around the plurality of tubes through which cooling water flows;

an upstream-side gas tank portion configured to form an upstream gas passage which communicates with the plurality of tubes on an upstream-side of the plurality of tubes;

a downstream-side gas tank portion configured to form a downstream gas passage which communicates with the plurality of tubes on a downstream-side of the plurality of tubes;

a water tank portion configured to form the first water passage around the plurality of tubes, the water tank portion forming a second water passage surrounding the upstream-side gas tank portion which communicates with the first water passage;

a double pipe portion separate from the upstream-side gas tank portion including an inside pipe and an outside pipe, the inside pipe forming an inlet gas passage which communicates with an inner portion of the upstream-side gas tank portion such that the exhaust gas flows through the inlet gas passage, the double pipe portion forming an annular water passage between the inside pipe and the outside pipe which communicates with the second water passage such that the cooling water flows through the annular water passage;

a water inflow portion connected to the outside pipe, through which the cooling water flows into the annular water passage; and a water outflow portion connected to the water tank portion, through which the cooling water flows out from the first water passage, wherein the upstream-side gas tank portion is inserted into the inside pipe with a first seal interposed between an outer surface of the upstream-side gas tank portion and an inner surface of the inside pipe, and the outside pipe is connected to the water tank portion in such a manner as to be inserted into the water tank portion with a second seal interposed between an outer surface of the outside pipe and an inner surface of the water tank portion.

2. The exhaust gas heat exchanging device according to claim 1, wherein the water tank portion includes a first split body and a second split body which are assembled to form the first and second water passage.

3. The exhaust gas heat exchanging device according to claim 1, wherein the exchange gas heat exchanging device further comprises a ring member that is fitted onto an outer circumferential portion of the water tank portion, and wherein the ring member supports the water tank portion.

4. The exhaust gas heat exchanging device according to claim 1, further comprising:

a header plate to which end portions of the plurality of tubes are connected, wherein the upstream-side gas tank portion is connected to the header plate.

5. The exhaust gas heat exchanging device according to claim 1, wherein end portions of the plurality of tubes are connected to the upstream-side gas tank portion and supported by the upstream-side gas tank portion.

6. An exhaust gas heat exchanging device comprising:

a heat exchanging core including a plurality of tubes through which an exhaust gas discharged from an internal combustion engine flows, the heat exchanging core defining a first water passage around the plurality of tubes, through which cooling water flows;

an upstream-side gas tank portion configured to form an upstream gas passage which communicates with the plurality of tubes on an upstream-side of the plurality of tubes;

a downstream-side gas tank portion configured to form a downstream gas passage which communicates with the plurality of tubes on a downstream-side of the plurality of tubes;

a water tank portion configured to form the first water passage around the plurality of tubes, the water tank portion forming a second water passage surrounding the upstream-side tank portion which communicates with the first water passage;

a double pipe portion separate from the upstream-side gas tank portion including an inside pipe and an outside pipe, the inside pipe forming an inlet gas passage which communicates with an inner portion of the upstream-side gas tank portion such that the exhaust gas flows through the inlet gas passage, the double pipe portion forming an annular water passage between the inside pipe and the outside pipe which communicates with the second water passage such that the cooling water flows through the annular water passage;

a water inflow portion connected to the outside pipe, through which the cooling water flows into the annular water passage;

a water outflow portion connected to the water tank portion, through which the cooling water flows out from the first water passage, wherein:

the double pipe portion is connected to the water tank portion and the upstream-side gas tank portion, the exchange gas heat exchanging device further comprises a ring member that is fitted on an outer circumferential portion of the water tank portion at a position where the outer circumferential portion of the water tank portion is in contact with the outer circumferential surface of the outside pipe, and the ring member supports the water tank portion at the position.

7. The exhaust gas heat exchanging device according to claim 6, wherein the water tank portion includes a first split body and a second split body which are assembled to form the first and second water passage.

8. The exhaust gas heat exchanging device according to claim 6, further comprising:

a header plate to which end portions of the plurality of tubes are connected, wherein the upstream-side gas tank portion is connected to the header plate.

9. The exhaust gas heat exchanging device according to claim 6, wherein end portions of the plurality of tubes are connected to the upstream-side gas tank portion and supported by the upstream-side gas tank portion.

* * * * *